United States Patent
Chen et al.

(10) Patent No.: US 7,236,622 B2
(45) Date of Patent: Jun. 26, 2007

(54) METHOD FOR FORMING A DEPTH IMAGE

(75) Inventors: Shoupu Chen, Rochester, NY (US); Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/048,166

(22) Filed: Feb. 1, 2005

(65) Prior Publication Data

US 2005/0129305 A1    Jun. 16, 2005

Related U.S. Application Data

(60) Continuation-in-part of application No. 10/337,505, filed on Jan. 7, 2003, now Pat. No. 6,891,966, which is a division of application No. 09/382,451, filed on Aug. 25, 1999, now Pat. No. 6,556,704.

(51) Int. Cl.
    *G06K 9/00* (2006.01)
(52) U.S. Cl. .................. 382/132; 382/255; 378/28
(58) Field of Classification Search .............. 382/103, 382/106, 107, 128, 129–134, 154, 168, 189, 382/194, 199, 203, 219, 255, 274, 285, 291, 382/295, 305, 318; 378/2, 38, 28; 348/43, 348/42, 587; 345/419
    See application file for complete search history.

(56) References Cited

U.S. PATENT DOCUMENTS

| | | | |
|---|---|---|---|
| 3,778,542 A * | 12/1973 | Hanseman | ................. 348/587 |
| 4,629,298 A | 12/1986 | Trumbull et al. | |
| 4,903,204 A * | 2/1990 | Dobbins, III | ................. 382/255 |
| 5,214,686 A * | 5/1993 | Webber | ................. 378/38 |
| 5,251,016 A | 10/1993 | Delwiche | |
| 5,359,637 A * | 10/1994 | Webber | ................. 378/2 |
| 5,812,214 A | 9/1998 | Miller | |
| 5,937,079 A * | 8/1999 | Franke | ................. 382/103 |
| 6,031,538 A * | 2/2000 | Chupeau et al. | ............. 345/419 |
| 6,163,336 A * | 12/2000 | Richards | ................. 348/42 |
| 6,384,859 B1 * | 5/2002 | Matsumoto et al. | .......... 348/43 |

OTHER PUBLICATIONS

Sheng-Lin Chou et al., "Line segment matching for 3D computer vision using a new iteration scheme", Machine Vision and Applications (1993) pp. 191-205.
Du-Ming Tsai et al., "Segmenting focused objects in complex visual images", Pattern Recognition Letters, 19, (1998), pp. 929-940.
James T. Dobbins III et al., "Digital x-ray tomosynthesis: current state of the art and clinical potential", Phys. Med. Biol., 48, (2003), pp. R65-R106.
Suresh B. Marapane et al., "Edge Segment Based Stereo Analysis", SPIE, vol. 1293—Applications of Articficial Intelligence VIII, (1990), pp. 140-151.
Suresh B. Marapane et al., "Region-Based Stereo Analysis for Robotic Applications", IEEE Transactions on Systems, Man, and Cybernetics, vol. 19, No. 6, Nov./Dec. (1989), pp. 1447-1464.

\* cited by examiner

*Primary Examiner*—Matthew C. Bella
*Assistant Examiner*—Seyed Azarian
(74) *Attorney, Agent, or Firm*—Susan L. Parulski

(57) ABSTRACT

A computer vision/image processing method generates a depth map. In one embodiment, the present invention provides a method of forming a relative depth map from at least three x-ray images of a patient taken from different perspectives. The method includes the steps of: (a) selecting one of the x-ray images as a reference image; (b) identifying corresponding objects within the reference image and the other images; (c) computing a disparity between the identified corresponding objects; and (d) generating the relative depth map from the disparities.

5 Claims, 14 Drawing Sheets

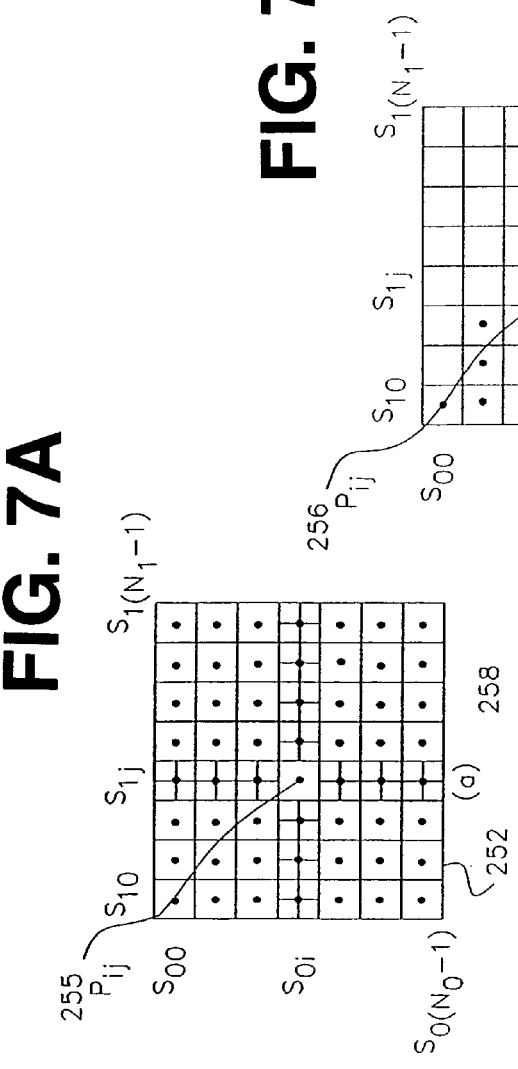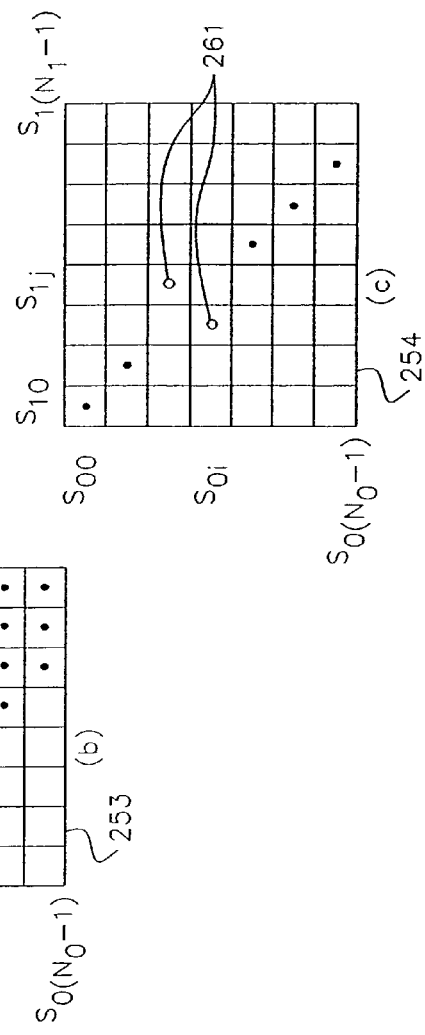
FIG. 7A
FIG. 7B
FIG. 7C

METHOD FOR FORMING A DEPTH IMAGE

CROSS-REFERENCE TO RELATED APPLICATION(S)

This is a continuation-in-part of U.S. Ser. No. 10/337,505, entitled "METHOD FOR FORMING A DEPTH IMAGE FROM DIGITAL IMAGE DATA" filed on Jan. 7, 2003 in the names of Chen, which issued on May 10, 2005 as U.S. Pat. No. 6,891,966, which itself is a divisional of U.S. Ser. No. 09/382,451, entitled "METHOD FOR FOREGROUND DEPTH MASK FORMATION OF DIGITAL IMAGE DATA" filed on Aug. 25, 1999 in the names of Chen, which issued on Apr. 29, 2003 as U.S. Pat. No. 6,556,704, both of which are incorporated herein by reference.

FIELD OF THE INVENTION

The invention relates to processing of image data, particularly medical image data. More particularly, the invention is directed to a method for the processing of a plurality of images associated with a scene imaging system that is capable of producing depth information of the scene.

BACKGROUND OF THE INVENTION

One embodiment of depth image formation is foreground extraction or background suppression that has been a topic in the composite photography and cinematography industry for many years. For instance, in U.S. Pat. No. 3,778,542 (issued Dec. 11, 1973 to L. C. Hanseman and entitled "Blue screen travelling matte system"), a blue screen travelling matte system is used to create special photographic effects. In this design, a particular selectable saturated color appearing in the simultaneous red, blue and green video output signals of an electronic color camera is sensed and removed from the video signals by electronic subtraction of the selected color. The output red, blue and green video signals derived from a second electronic color camera are substituted for the removed saturated color. The final composite red, blue and green video output signals therefore contain picture elements from both cameras, combined in a manner such that the specific saturated color from the first camera is completely eliminated and replaced by picture elements derived from the second camera. One of the limitations of this system is that a uniformly colored (blue, green, or any constant backing color) background is required in order to extract the region of interest (human figure, for instance, in a newscast). This requirement in turn demands a constrained, structured environment that would limit the usage of this technology to very controlled situations. Many variations of blue screen method have been developed over the years (see, e.g., U.S. Pat. Nos. 5,812,214; 5,251,016; and 4,629,298) but they all have the same limitations mentioned hereinabove.

It is understood that the purpose of imposing the aforementioned background restrictions is to compensate for the lack of enough information in the background suppression process. If these restrictions are to be removed, other information must be included so that the problem is still solvable. For example, in Tsai et al. ("Segmenting focused objects in complex visual images," *Pattern Recognition Letters*, 19, pp. 929–940, 1998) the measurement of defocus of object edges in an image is used to separate complex foreground and background objects. Thus Tsai et al introduces the notion of spatial separation by looking at the degree of defocusing of the image objects. It is known that a two-dimensional planar intensity image is a perspective projection of a three-dimensional scene. It appears that the degrees of freedom of dimension are reduced from 3 to 2, but the spatial information in the third dimension seems lost in the course of projection. This lost spatial information is physically the distance (depth) from the scene to the sensing device, that is, the camera. In fact, the depth information is embedded in the original image pixel locations in that their locations are tightly related to the depth of the corresponding 3D scene. This spatial information, which is lost in the 2D projection, can be recovered by searching corresponding points (pixel locations) in a plurality of displaced intensity images of the scene.

FIG. 1 illustrates an exemplary background suppression system equipped with a pair of cameras 11*a* and 11*b* that capture two color images: top image 13*b* and bottom image 13*a*. Notice that the contents in the two images, e.g., the respective person images 14*a* and 14*b* and computer images 15*a* and 15*b*, have a vertical dislocation if the edges of the image frames are aligned. This dislocation is called global disparity, and it is a function of the average distance of the scene from the camera. The system needs to find individual disparity corresponding to each visible surface point in the scene so that a depth image can be produced. The value of each pixel in the depth image will represent the distance from the corresponding scene point being projected to that pixel location. In foreground extraction situations, the depth image is usually displayed as a gray scale image 10 as shown in FIG. 1 although it could also be displayed as a color image if the gray scale is color-coded. The depth image 10 in FIG. 1 reveals that a person 17 is in the foreground with a higher gray scale and a computer 16 is in the background with a lower gray scale. Intuitively, the foreground can be separated from the background based on such depth values. The separation of foreground and background can lead to the formation of a foreground mask image 18 showing a depth mask 19. The mask 19 is then used to select the corresponding person region 21 of the bottom intensity image 13*a,* and thereby produce a foreground image. The same mask is also used in compositing images as shown in FIG. 2 where the person 21 is added to the scene of a door 31. In this case, the foreground mask image 18, with the person depth mask 33, is used to suppress a portion of the background in the door image 31, thereby generating an intermediate image 34 in which a portion 35 of the door 36 is blocked out so that a person region 21 may be substituted in its place in the resultant composite image 41. Notice that the suppressed background is not a constant backing color scene.

From another perspective, separating foreground and background is essentially an image segmentation task that is formidable without a model, especially where there is a complex background. For example, FIG. 3 presents a scene with a person 63 in the foreground and a face picture 62 in the background. Usually, a face model would be used to single out the person in the image. If so, the face picture in the background will still be classified as part of the foreground and be selected as well. However, with the help of depth information, background suppression for this kind of scene would be possible. Accordingly, using the depth information of a scene is an effective way to extract foreground or suppress background of the scene image. The key issues, however, are the acquisition and processing of the depth information. Conventional depth recovery algorithms (see S B Marianne and M. M. Trigged, "Region-based stereo analysis for robotic applications, "*IEEE Trans. Systems, Man, and Cybernetics,* 19(6): 1447–1464, 1989, and S. B. Marapane and M. M. Trivedi, "Edge segment based stereo analysis," *SPIE Vol.* 1293, *Applications of Artificial Intelligence VIII,* pp. 140–151, 1990) do not provide clear depth boundaries (depth discontinuities) that are needed in forming a clear foreground depth mask.

Another embodiment of depth image formation is 3D (three-dimensional) reconstruction of medical images. Dobbins et al ("Digital x-ray tomosynthesis: current state of the art and clinical potential", Phys. Med. Biol. 48 (2003) R65–R106) provides a review of x-ray tomosynthesis. Digital x-ray tomosynthesis is a technique for producing slice images using conventional x-ray systems. It is a refinement of conventional geometric tomography, which has been known since the 1930s.

In conventional geometric tomography, an x-ray tube and image receptor move in synchrony on opposite sides of the patient to produce a plane of structures in sharp focus at the plane containing the fulcrum of the motion; all other structures above and below the fulcrum plane are blurred and thus less visible in the resulting image. Tomosynthesis improves upon conventional geometric tomography in that it allows an arbitrary number of in-focus planes to be generated retrospectively from a sequence of projection radiographs that are acquired during a single motion of the x-ray tube. By shifting and adding these projection radiographs, specific planes may be reconstructed. While the methods reviewed in the Dobbins article can provide users with adequate 2D images, the methods do not produce meaningful 3D structures (depth information).

Accordingly, there exists a need for a method to provide clear depth boundaries so that a meaningful depth image, or map, can be formed.

One use is to provide an image composite system wherein a foreground depth mask (or a 3D structure) is formed by the means of analyzing the depth map of a scene. While this depth image, or map, can be used in the preferred embodiments of the present invention in connection with an image composite system, it should be recognized that such a depth image would be useful in a variety of situations, such as in the formation of virtual images. As such, an object is to provide a scene depth imaging system in which a scene depth map produced from a plurality of images provides meaningful depth data.

SUMMARY OF THE INVENTION

It is an object of the present invention to provide a scene depth imaging system in which a scene depth map produced by a plurality of images (particularly medical images) provides more accurate depth data.

It is a further object of the present invention to provide such an image system wherein a foreground depth mask is formed by the means of analyzing the depth map of a scene.

The present invention is directed to overcoming one or more of the problems set forth above.

According to one aspect of the present invention, the present invention provides a method of forming a relative depth map from at least three x-ray images of a patient taken from different perspectives. The method includes the steps of: (a) selecting one of the x-ray images as a reference image; (b) identifying corresponding objects within the reference image and the other images; (c) computing a disparity between the identified corresponding objects; and (d) generating the relative depth map from the disparities.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT

The present invention provides a method of forming a depth map of a scene that facilitates forming a relative depth image from a plurality of medical projection radiographs. Conventional method of shifting and adding projection radiographs reconstructs two-dimensional images. This invention utilizes the shifting and adding projection radiographs together with stereo-vision techniques to produce meaningful 3D structures for visualization.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIGS. 7A, 7B, and 7C are score-matrices in a corresponding points search process for two images.

DETAILED DESCRIPTION OF THE INVENTION

Figure 1:
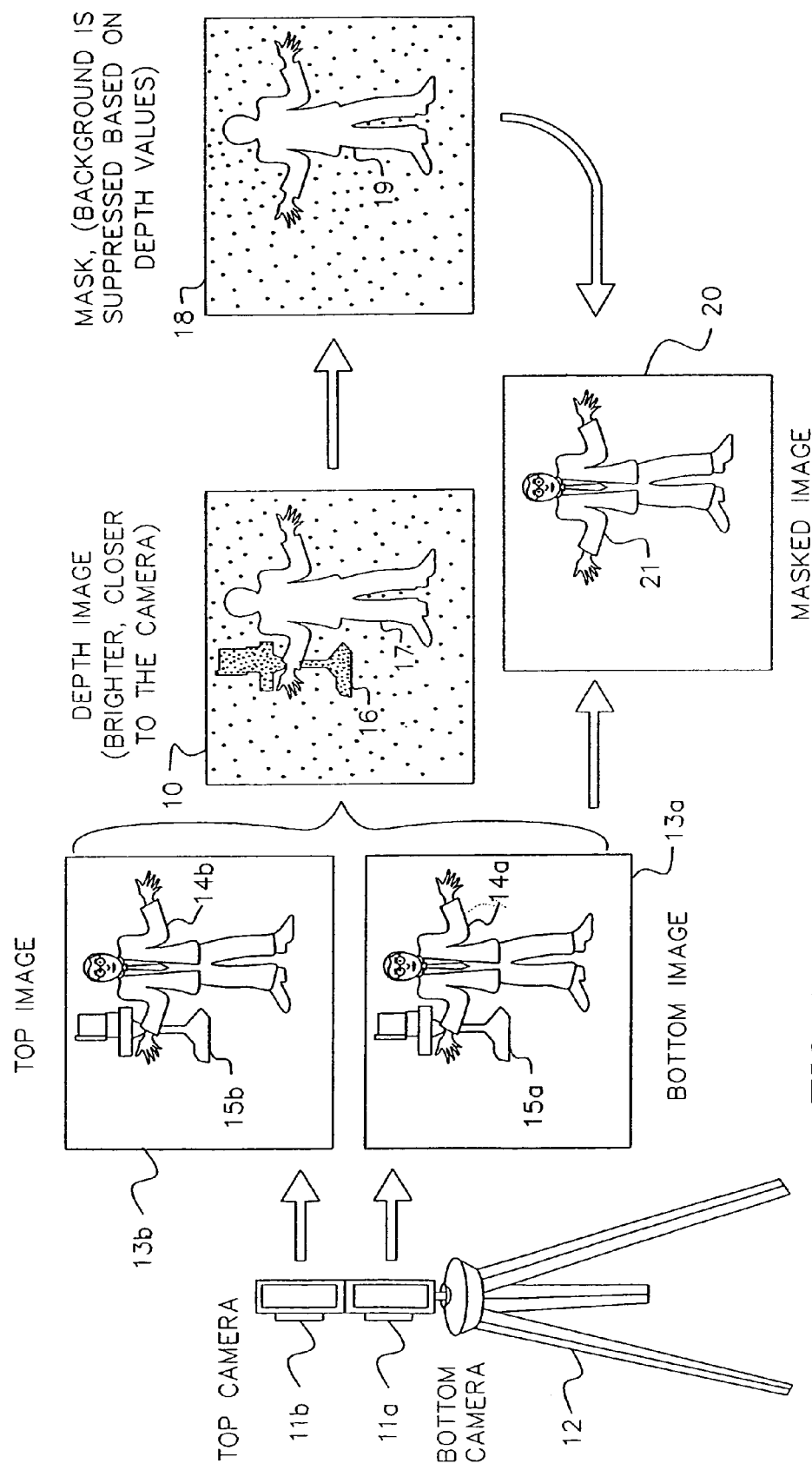
FIG. 1 is a schematic flow chart illustrating the successive stages of a foreground depth mask formation process in which a foreground depth mask (and the masked foreground intensity image) is produced by using a pair of intensity images captured by a pair of vertically displaced cameras.
Figure 2:
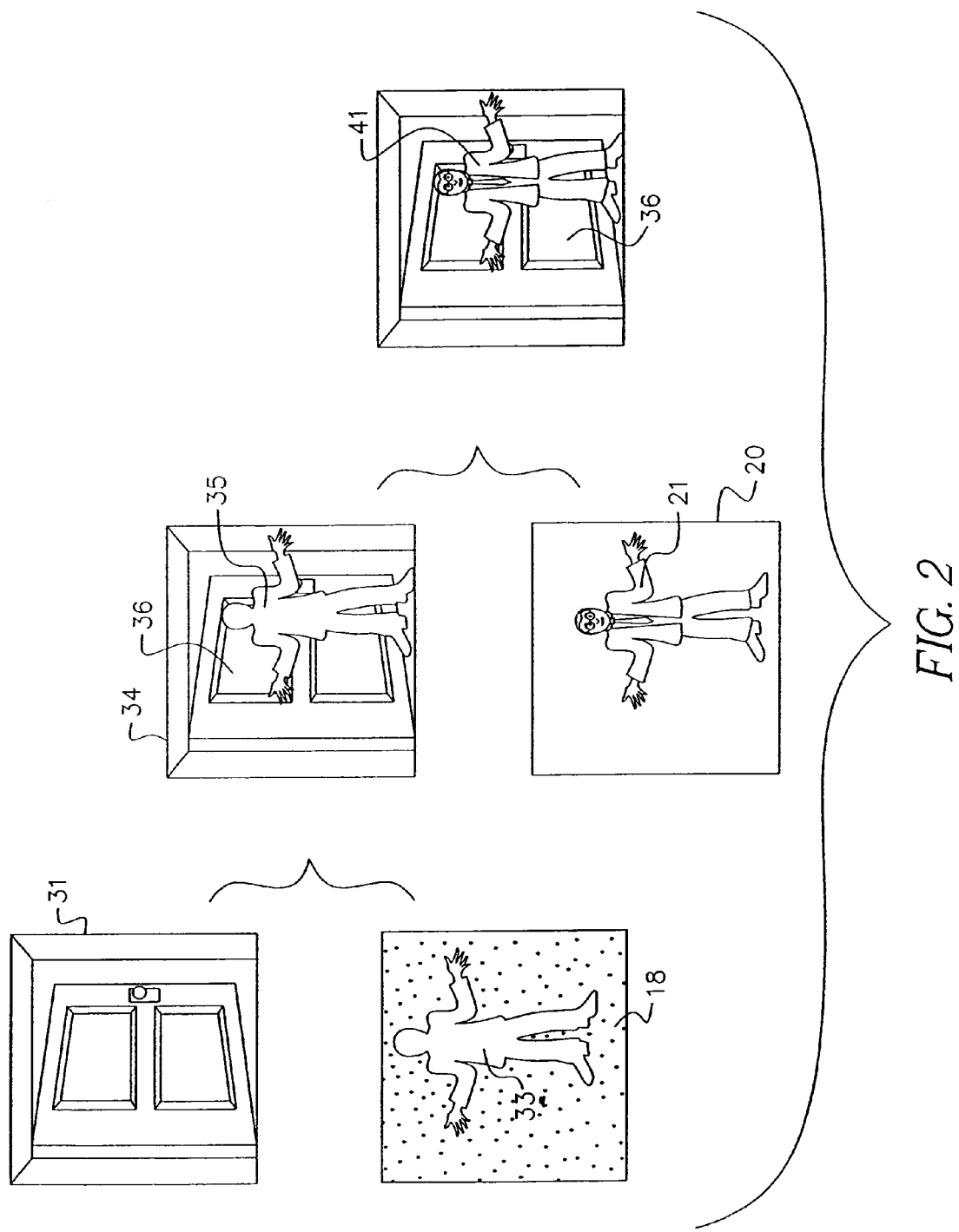
FIG. 2 is a schematic flow chart illustrating the successive stages of an image composite process in which a composite image is produced by using a background image and the foreground depth mask (and the masked foreground intensity image) generated in the process illustrated in FIG. 1.
Figure 3:
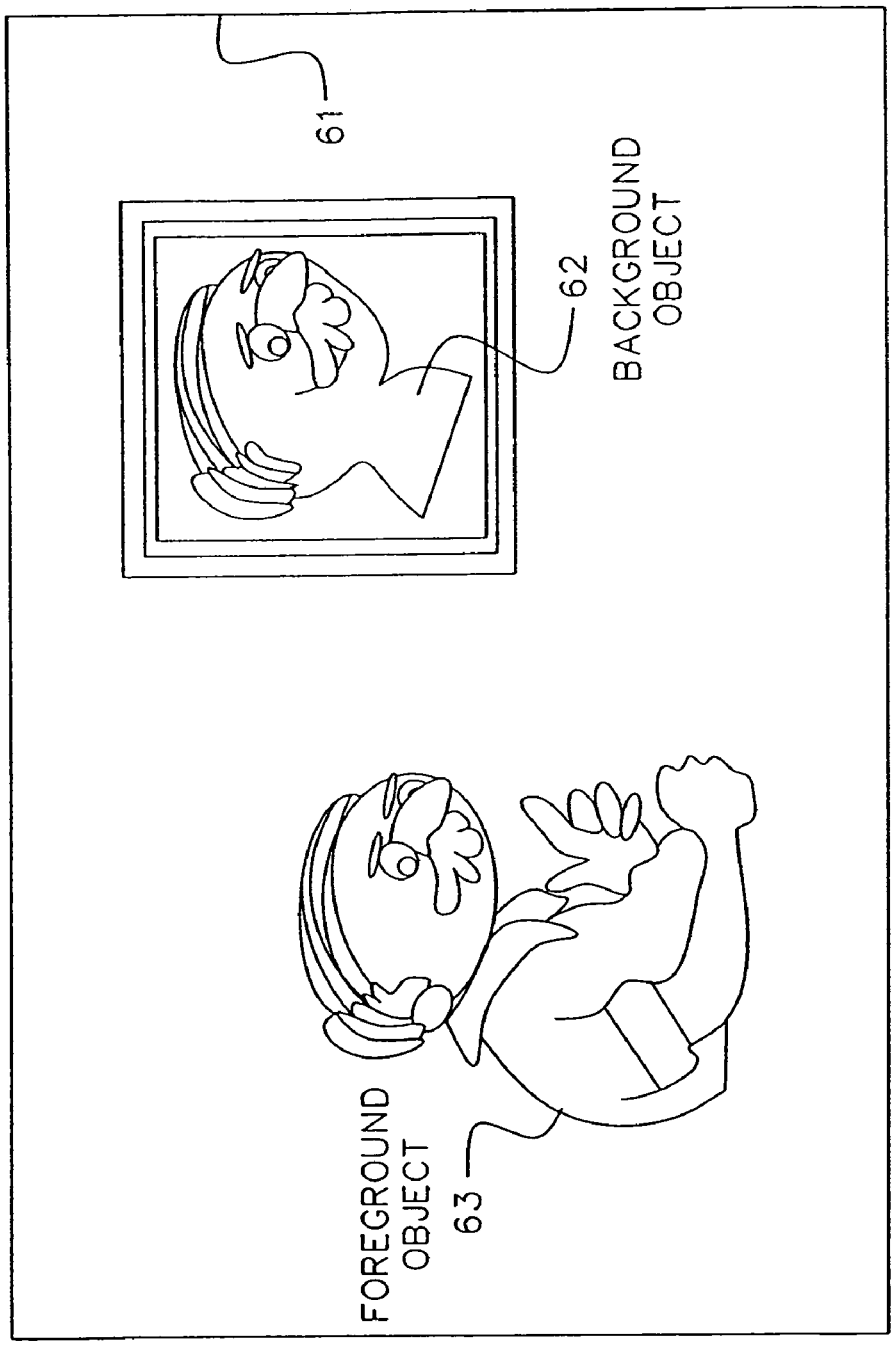
FIG. 3 is a pictorial view of a foreground object and a background object that has almost the same characteristics as the foreground.

The following is a detailed description of the preferred embodiments of the invention, reference being made to the drawings in which the same reference numerals identify the same elements of structure in each of the several figures.

Reference is made to commonly assigned U.S. Ser. No. 09/162,310, entitled "Method and Apparatus for Capturing Panoramic Images with Range Data", filed Sep. 28, 1998 in the names of Lawrence A. Ray, Carl N. Schauffele and Brett VanSprewenburg, assigned to the assignee of this application, which issued on Feb. 8, 200 as U.S. Pat. No. 6,023,588

Reference is made to commonly assigned U.S. Ser. No. 09/383,573, entitled "Method for Creating an Environment Map Containing Information Extracted from Stereo Image Pairs", filed on Sep. 28, 1998 in the names of Nathan P. Cahill and Shoupu Chen, assigned to the assignee of this application, which issued on Jan. 14, 2003 as U.S. Pat. No. 6,507,665.

In the following description, a preferred embodiment of the present invention will be described as a software program. Those skilled in the art will recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components and elements known in the art. Given the description as set forth in the following specification, all software implementation thereof is conventional and within the ordinary skill in such arts. In the following, the phrase "depth map" will sometimes be used interchangeably with "depth image", unless the context indicates otherwise.

Still further, as used herein, the software program may be stored in a computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 12:
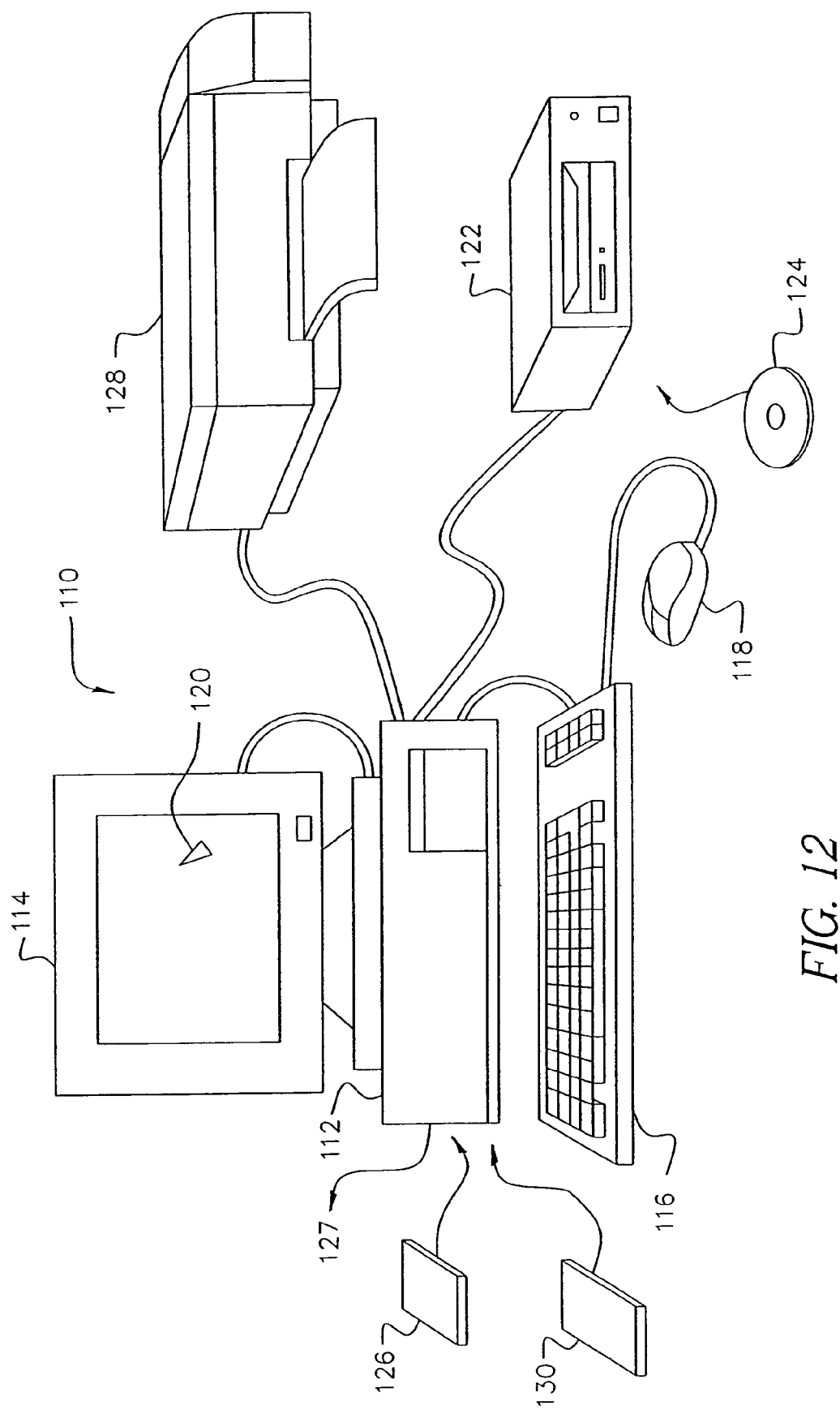
FIG. 12 is a perspective diagram of a computer system for implementing the present invention.

Referring to FIG. 12, there is illustrated a computer system 110 for implementing the present invention. Although the computer system 110 is shown for the purpose of illustrating a preferred embodiment, the present invention is not limited to the computer system 110 shown, but may be used on any electronic processing system. The computer system 110 includes a microprocessor-based unit 112 for receiving and processing software programs and for performing other processing functions. A display 114 is electrically connected to the microprocessor-based unit 112 for displaying user-related information associated with the software. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 122 is connected to the microprocessor based unit 112 for receiving software programs and for providing a means of inputting the software programs and other information to the microprocessor based unit 112 via a compact disk 124, which typically includes a software program. In addition, a floppy disk 126 may also include a software program, and is inserted into the microprocessor-based unit 112 for inputting the software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 is connected to the microprocessor-based unit 112 for printing a hardcopy of the output of the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of an image on the display 114. Images may also be input via the compact disk 124, the floppy disk 126, or the network connection 127. Any images stored in the PC card 130, the floppy disk 126 or the computer disk 134, or input through the network connection 127, may have been obtained from a variety of sources, such as a digital camera (not shown) or a scanner (not shown). In accordance with the invention, the images are obtained and processed in accordance with the following techniques and methods.

System Design

Figure 4:
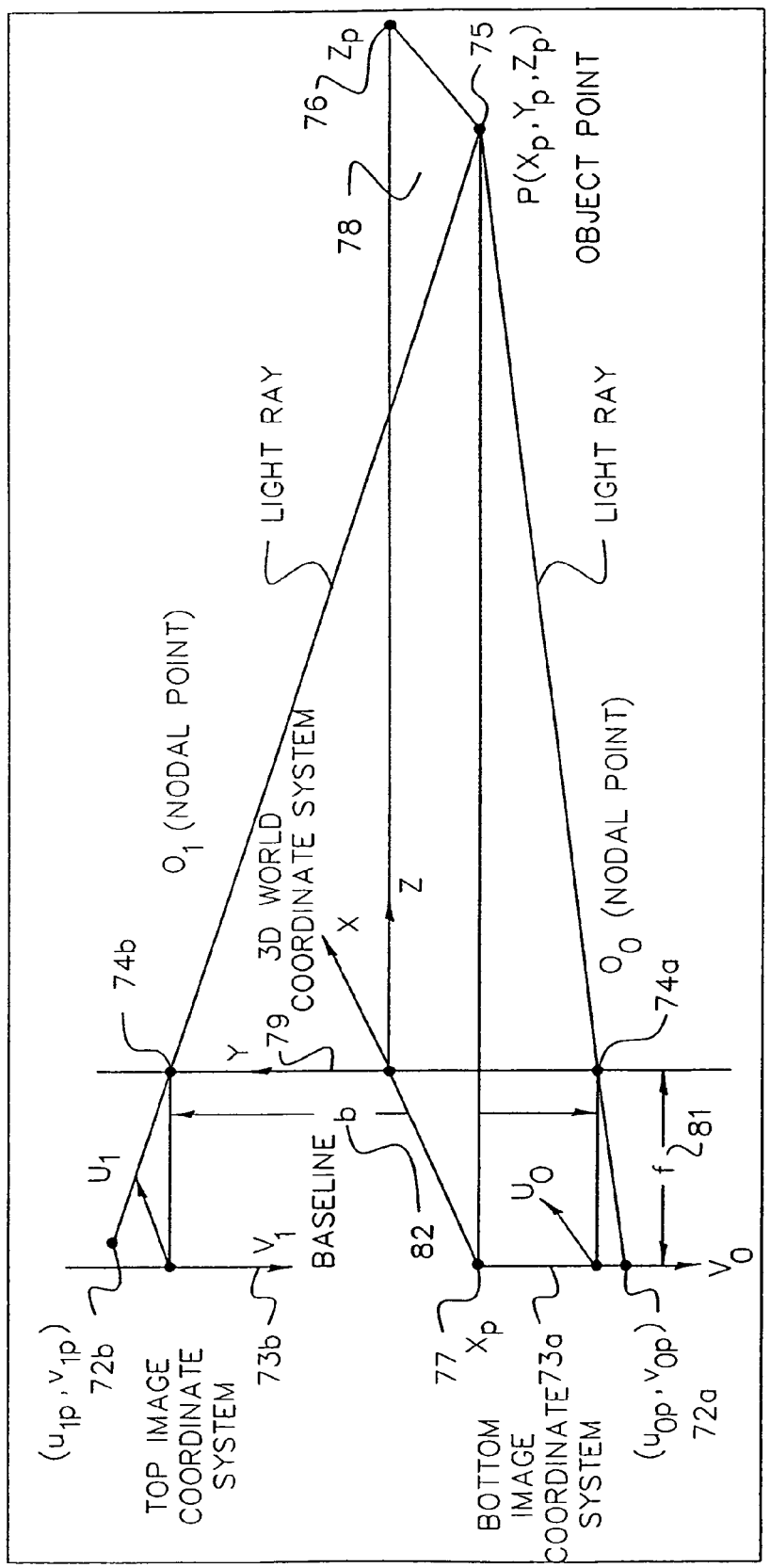
FIG. 4 is a representation of the optical geometry associated with two images of a scene.

With reference to FIG. 1, two vertically mounted cameras 11a and 11b, which are described in more detail in the aforementioned U.S. Ser. No. 09/162,310, and which is incorporated herein by reference, are arranged to capture two vertically displaced versions of the same scene, the bottom image 13a and the top image 13b. FIG. 4 shows the relationship between the camera 2D image coordinate system (73a and 73b), for the two images 13a and 13b, and a 3D world coordinate system 79. More specifically, the origin of the three-dimensional world coordinate system 79 is defined at the center of the line between a bottom camera nodal point 74a and a top camera nodal point 74b. The perspective projection of a 3D point 75 (also shown as point p and represented by $(x_p, y_p, z_p)$, which, without loss of generality, is in an XZ plane 78), is denoted by points $(u_{0p}, v_{0p})$ 72a and $(u_{1p}, v_{1p})$ 72b for the bottom image and the top image, respectively. The disparities associated with the point p are defined as $$d_{u_p} = u_{0p} - u_{1p} \qquad \text{Eq. (1)}$$

and $$d_{v_p} = v_{0p} - v_{1p} \qquad \text{Eq. (2)}$$

Those skilled in the art will recognize that multiple cameras (i.e., more than two) can be vertically mounted to accomplish depth image formation tasks using the methods of the present invention. Those skilled in the art will also understand that two or more cameras can be horizontally mounted to accomplish depth image formation tasks using the methods of the present invention. Further more, those skilled in the art will understand that images captured by the multiple cameras can be obtained by using one single camera positioned at multiple positions.

In practice, the cameras are arranged in such a way that the value of one of the disparities is always considered to be zero. In the present invention $d_{u_p}=0$. The depth information 76, i.e., coordinate $z_p$ of point p (75), can be readily computed using the found disparity $d_{v_p}:z_p=fb/d_{v_p}$, where b is a baseline 82 and f is a focal length 81. The cameras 11a, 11b are assumed to be identical and share in the same optical specifications, e.g., focal length 81 and field of view. The baseline 82 (i.e., the distance between the top and bottom images) of the two cameras 11a, 11b directly influences the resolution of depth estimates for each point in the captured image. The length of the baseline 82 is a function of the expected distance from the camera to the objects of interest; i.e., a longer baseline is more useful than a short baseline for distant subjects. To permit this adjustment, as described in the aforementioned U.S. Ser. No. 09/162,310, the camera system has an adjustable vertical baseline mechanism, such as an adjustable rack and pinion on a camera support. The amount of vertical baseline 82 is displayed on a vernier gauge on the support. The baseline distance 82 may be read from the vernier gauge and then employed, together with the focal length and the found disparity, in accurately determining the distance $z_p$ from the cameras 11a, 11b to the point 75.

Figure 5:
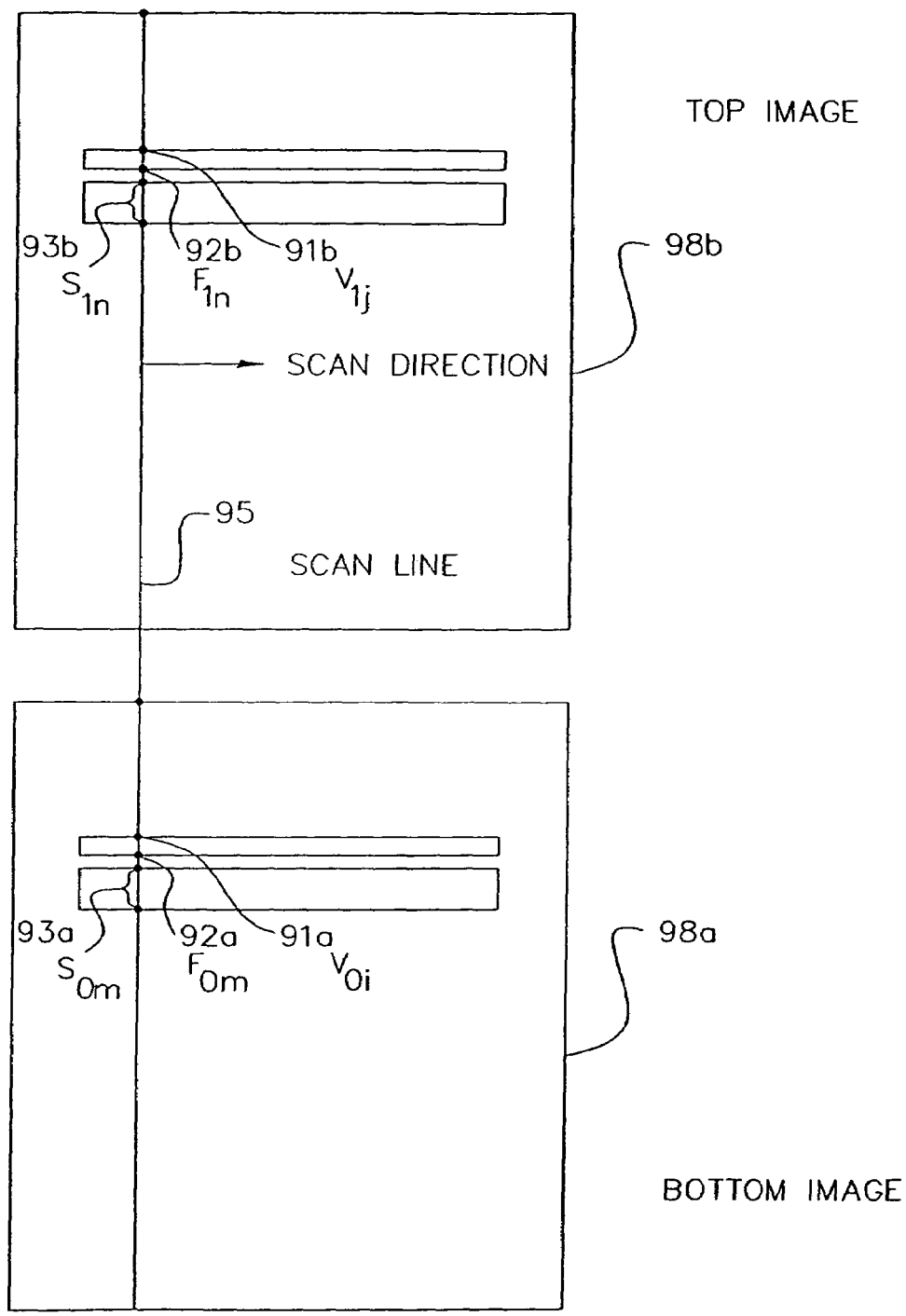
FIG. 5 is a pictorial view of a pair of images in a process of searching corresponding points on a particular vertical scan line.
Figure 6:
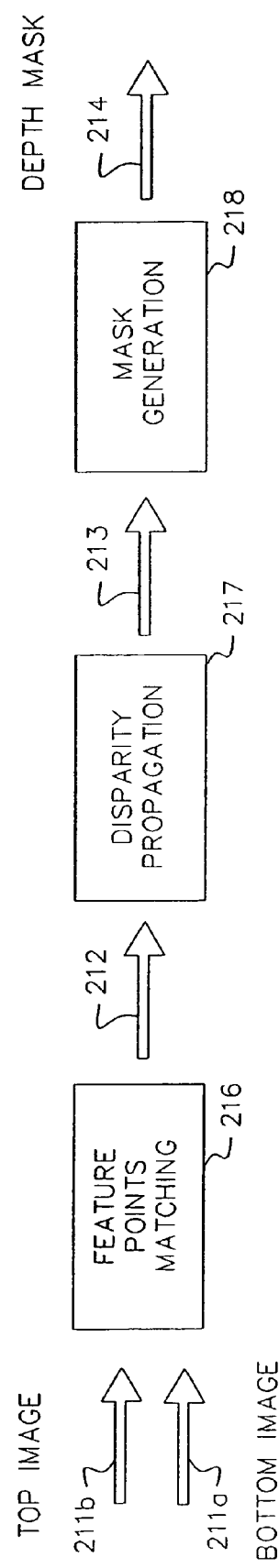
FIG. 6 is the flow chart for the major algorithmic steps which are performed to effect formation of a foreground depth mask in accordance with the method of the present invention.

In FIG. 4, the two cameras are aligned vertically. Therefore, $u_{0p}=u_{1p}$. To estimate the depth of a 3D point in the scene, the search for corresponding points in two images is conducted along a vertical scan line 95 as illustrated in FIG. 5. The search dimensions are thus reduced from 2 to 1. An algorithm with this arrangement for generating a depth map of the scene to suppress the background is outlined in FIG. 6. It comprises several key stages including feature points matching 216, disparity propagation in feature space 217, and foreground depth mask formation 218.

Feature Points Matching

The search of corresponding points (matching points) is not conducted at every pixel of the image, but rather at the pixels that are feature points (edge points) of the intensity image, for instance, at the locations of vertical indices 91a and 91b ($v_{0i}$ and $v_{1j}$) in FIG. 5. These feature points can be obtained in a conventional manner in a variety of ways, for example, by applying a gradient operator to each column (vertical scan-line) of the two images. Denote a feature point map by $\Phi_k$; k=0,1; with the same dimension, M×N, as the intensity image, k=0 for the bottom image, and k=1 for the top image. The feature point map can be expressed as $$\Phi_k=[\varphi_0^k, \ldots, \varphi_n^k, \ldots, \varphi_{N-1}^k] \quad \text{Eq. (3)}$$

where $$\varphi_n^k = [\phi_{0n}^k, \ldots, \phi_{mn}^k, \ldots, \phi_{(M-1)n}^k]' \quad \text{Eq. (4)}$$

and $$\phi_{mn}^k = \begin{cases} 1 & \text{if there is a feature point at location } (m, n) \\ 0 & \text{otherwise} \end{cases} \quad \text{Eq. (5)}$$

Denote the feature point itself by $F_{kw}$, where k=0,1, and w=0,1,2, ..., $N_k$. $N_k$ is the number of feature points. With reference to FIG. 5, the example feature points 92a and 92b are shown as $F_{0m}$ and $F_{1n}$, respectively. The index for a specific column is omitted, since the search of matching points is conducted one column at a time. The value of a feature point $F_{kw}$ is the vertical coordinate where the feature point resides. For instance:

$$F_{00}=m; \text{ if } \phi_{mn}^0=1 \text{ and if this is the first feature point} \quad \text{Eq. (6)}$$

The origin of the image coordinate system is at the center of the image as shown in FIG. 4. The feature points are indexed from the top of the image towards the bottom, so there is an ordering property associated with the feature points:

$$F_{ki} < F_{k(i+1)} \quad \text{Eq. (7)}$$

Denote an intensity parameter, hereinafter referred to as an intensity segment, starting from a feature point $F_{ki}$ to the subsequent feature point $F_{k(i+1)}$ by $$S_{ki}=I_k[F_{ki}, F_{ki}+1, \ldots, F_{k(i+1)}-1, F_{k(i+1)}] \quad \text{Eq. (8)}$$

where k=0,1; and $I_k[\ldots]$ signifies a sequence of intensity values at the locations indicated by the attributes inside the brackets. With reference to FIG. 4, examples of intensity segments 93a and 93b are shown as $S_{0m}$ and $S_{1n}$, respectively. The general match procedure is explained below.

Suppose the match process takes the bottom image 98a (see FIG. 5) as the reference image and searches for a match in the top image 98b (FIG. 5). Using Eq. (8) to construct an intensity segment for the reference image gives:

$$S_{0i}=I_0[F_{0i}, F_{0i}+1, \ldots, F_{0(i+1)}-1, F_{0(i+1)}]; i=0, \ldots N_0-1 \quad \text{Eq. (9)}$$

where $N_0$ is the number of feature points on a specific column in the bottom image. Notice that $S_{0i}$ starts at a feature point $F_{0i}$; ends at a subsequent feature point $F_{0(i+1)}$. Every $S_{0i}$ in the bottom image seeks a best match in the top image. The candidate segment in the top image is constructed differently as $$S_{1j}=I_1[F_{1j}, F_{1j}+1, \ldots, F_{1j}+L_{0i}-1, F_{1j}+L_{0i}]; j=0, \ldots, N_1 \quad \text{Eq. (10)}$$

where $L_{0i}=F_{0(i+1)}-F_{0i}$, and $N_1$ is the number of feature points on a specific column in the top image. Notice that $S_{1j}$ starts at a feature point $F_{1j}$; ends at a pixel that is not necessarily the subsequent feature point $F_{1(j+1)}$. With this construction, $S_{1j}$ has the same length as $S_{0i}$, which is required by the following score computing process. It should be pointed out that there are other methods to construct two equal length segments, such as decimation for the longer one to take out some elements, or interpolation for the shorter one to add some elements.

Figure 13:
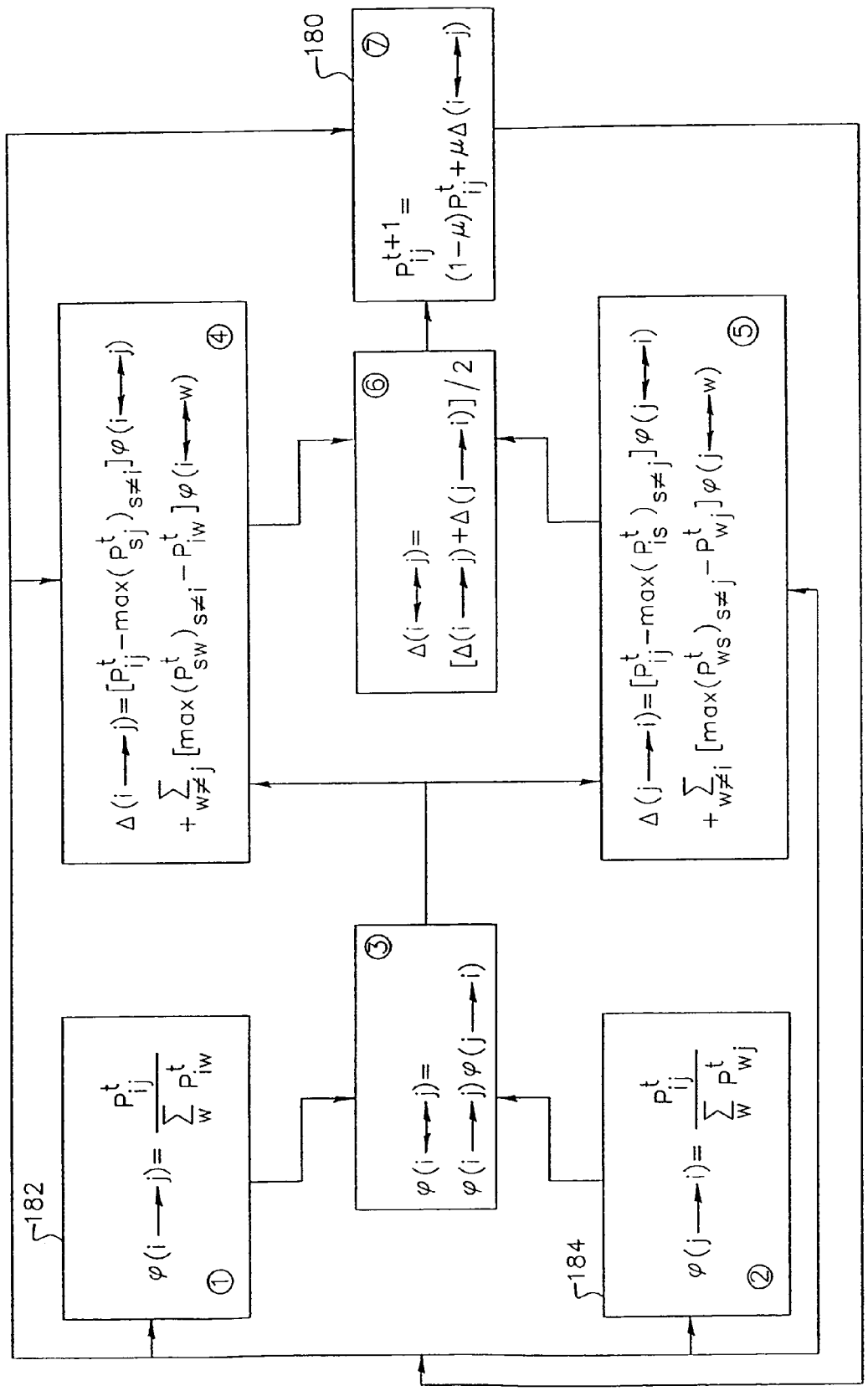
FIG. 13 is an example of a bipartite match network.

It can be seen that there are maximum $N_0 \times N_1$ pairs of feature point guided segments to compare in order to get at most min($N_0$, $N_1$) pairs of best matches. This can be represented by an $N_0 \times N_1$ matrix 252 as shown in FIG. 7A, which represents pairs of intensity values indicative of potential correspondence between features in the two intensity images. Every pair of $S_{0i}$ and $S_{1j}$ is associated with a match score 255 as the matrix element (i.e., a match score value $P_{ij}$ for each matrix location as represented by a filled in circle in the matrix 252). The score is computed as $$P_{ij}=1/SSD(S_{0i}, S_{1j}) \quad \text{Eq. (11)}$$

where SSD stands for Sum of Squared Difference, and $$SSD(S_{0i}, S_{1j}) = \frac{[S_{0i} - S_{1j}] \cdot [S_{0i} - S_{1j}]}{\sqrt{(S_{0i} \cdot S_{0i})(S_{1j} \cdot S_{1j})}} \qquad \text{Eq. (12)}$$

where "●" signifies an inner product operation. For each $S_{0i}$ the matched pair $S_{0i} \leftrightarrows S_{1j}$, where $\leftrightarrows$ indicates a match, is the one that maximizes the score $P_{ij}$. Conflict occurs when more than one $S_{0i}$ claims the same $S_{1j}$ as a match mate. To achieve at-most-one-to-one match, the $P_{ij}$s are fed into a bipartite match network (see FIG. 13) as initial values $P_{ij}^0$. The match goes through an iteration process (score updating block 180) using the interaction information contained in the network. In the score updating block 180, μ is a parameter within the range [0,1], $\Delta(i \leftrightarrows j)$ denotes the support function for the true match of segments $S_{0i}$ and $S_{1j}$. (See also Chou, S. L. and Tsai, W. H., "Line segment matching for 3D computer vision using a new iteration scheme," *Machine Vision and Applications*, No. 6, pp 191–205, 1993.) To adjust the score of a pair, say, $(S_{0i}, S_{1j})$, the match status of all the segments paired with either $S_{0i}$ or $S_{1j}$ (see FIG. 7A, those pairs indicated with a crossmark 258) are checked. If many segments take $S_{0i}$ or $S_{1j}$ as their best matches, the interference is strong and the score $P_{ij}^t$ is decreased; otherwise, $P_{ij}^t$ is increased. By iterations, the process converges to a final result $P_{ij}^T$. The termination time T can be determined either by a fixed iteration value or by checking if the score change is less than a preset.

In general, there are $N_0 \times N_1$ pairs to compare. But in reality, some pairs are not feasible. For instance, a segment at the top of the bottom image has no chance to pair with a segment at the bottom of the top image. So a disparity limit constraint is applied to the initial score computation as $$P_{ij}^0 = \begin{cases} 0 & \text{if } |F_{0i} - F_{1j}| > fb/z_{\min} \\ 1/SSD(S_{0i}, S_{1j}) & \text{otherwise} \end{cases} \qquad \text{Eq. (13)}$$

where $z_{min}$ is the distance of the nearest scene point to the camera. FIG. 7B shows the initial score matrix 253 after applying the disparity limit constraint. The bipartite match network takes scores in FIG. 7B as the initial values in blocks 182 and 184 (FIG. 13), and the iteration process ignores those pairs having zero score value. This modification not only reduces the computational complexity, but also reduces the false positive rate.

There is another constraint introduced in the match process: the ordering constraint. It simply states:

$$\text{if } S_{ki} \leftrightarrows S_{kj}|_{k \neq k'} \text{ then } S_{k'(i-i')} \sharp S_{k'(j+j')}|_{k \neq k'} \qquad \text{Eq. (14)}$$

where ♯ reads 'not match' and $i' \geq 1$; $j' \geq 1$; $k=0,1$; $k'=0,1$. This can be deduced from Eq. (7). As shown in FIG. 7C, in the final match result the two matched pairs marked as circles 261 should be taken out because they violate what stated in Eq. (14).

Figure 8:
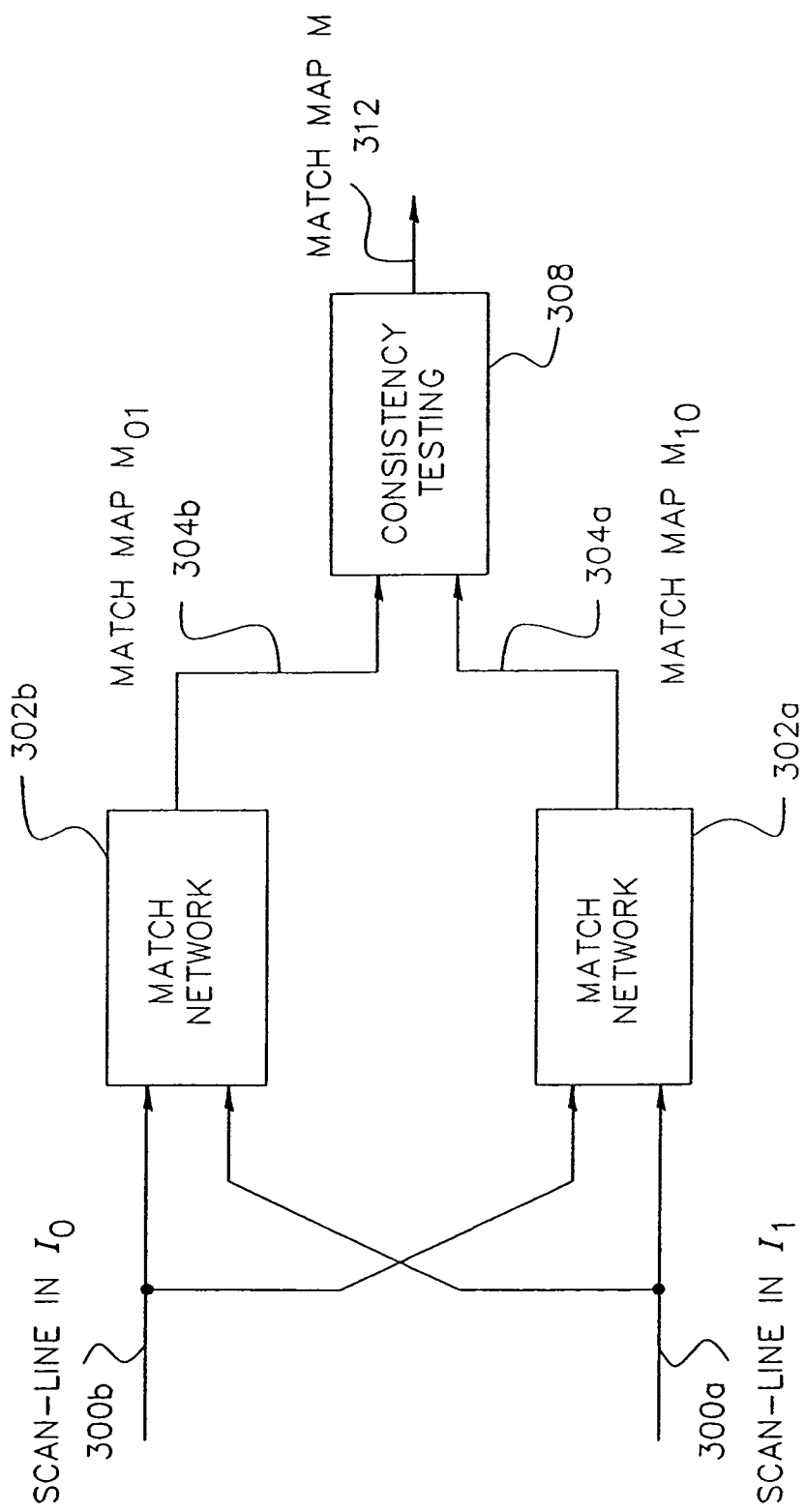
FIG. 8 is a more detailed flow chart for the first step in FIG. 6.

However, mismatches still exist in the above discussed match process. To further reduce the false positives caused by mismatches, the match process uses two match networks 302a and 302b followed by a consistency test block 308 as shown in FIG. 8. Each match network takes one image as the reference and the other image as the candidate, and produces a $N_0 \times N_1$ match map 304b or 304a (i.e., either match map $M_{01}$ or match map $M_{10}$), an element of which will be set to 1 if there is a match claimed, otherwise the element is set to 0. The final match map 312 (M) is the result of an AND, ∩, operation being applied to the two individual match maps which are usually not identical. That is, $$M = M_{01} \cap M_{10} \qquad \text{Eq. (15)}$$

The above match process is applied to one scan-line at a time. It is needed to define a full size depth image D that has the same dimension, M×N, as the intensity image:

$$D = [d_0, \ldots d_n, \ldots d_{N-1}] \qquad \text{Eq. (16)}$$

where $d_n$ is an M×1 column vector:

$$d_n = [d_{0n}, \ldots d_{mn}, \ldots d_{(M-1)n}]^t \qquad \text{Eq. (17)}$$

and $d_{mn} = F_{0i} - F_{1j}$, if $\phi_{mn}^0 = 1$ and if the match map M for this particular column n confirms that the feature point at the location (m, n) in the bottom image indeed has a match represented by $S_{0i} \leftrightarrows S_{1j}$. Otherwise, $d_{mn} = 0$, if $\phi_{mn}^0 = 1$ and if the match map M for this particular column n confirms that the feature point at the location (m, n) in the bottom image does not have a match. The values $d_{mn} = F_{0i} - F_{1j}$ therefore correspond to the aforementioned found disparities $d_{v_p}$, and as such form the basis for determining the distances $z_p = fb/d_{v_p}$, where b is the baseline 82 and f is a focal length 81 of the imaging system. For later use, denote the collection of the elements of D that are assigned with depth values by D' and the collection of elements with no depth values by D".

Color Property Assisted Depth Propagation

The depth map or depth image D has validated (through consistency testing) depth values $d_{mn}$ at pixels that are feature points. The obtained depth image has very low spatial density, that is, a large amount of pixels including those pixels within the feature point set have not been assigned with depth values. In many cases a denser or a more completely defined depth field is desirable. A common practice in the machine vision community to tackle this problem is to fit surface patches to depth measurements that are available. A simple surface fitting approach most likely will blur the depth boundaries (depth discontinuity) that are represented by depth values at those feature points. In accordance with the current invention, color properties of the original intensity image are incorporated in depth surface fitting to preserve clear depth boundaries. The process splits into two steps: propagation and interpolation. The propagation step will be explained below. The interpolation step will be discussed along with the depth mask formation procedure.

In accordance with the current invention, two color property maps are used, an M×N hue map H and an M×N purity map P for the original color (R,G,B) image. An element $h_{mn}$ of the hue map H is computed using the formula:

$$r = R/RGB; \; g = G/RGB; \; b = B/RGB; \qquad \text{Eq. (18)}$$

$$x = \frac{2r - g - b}{\sqrt{6}\sqrt{(r-1/3)^2 + (g-1/3)^2 + (b-1/3)^2}}$$

$$h_{mn} = \begin{cases} \acos(x) & \text{if } g < b \\ 2\pi - \acos(x) & \text{if } g \geq b \end{cases}$$

An element $p_{mn}$ of the purity map is computed as:

$$p_{mn} = r + g + b - 3 \min(r,g,b) \qquad \text{Eq. (19)}$$

Define an M×N unmatched feature point map, Λ, with its element $\lambda_{mn}$:

$$\lambda_{mn} = \begin{cases} 1 & \text{if } \phi_{mn}^0 = 1 \text{ and } d_{mn} \in D'' \\ 0 & \text{otherwise} \end{cases} \quad \text{Eq. (20)}$$

where $\phi_{mn}^0$ is defined in Eq. (5).

Figure 9:
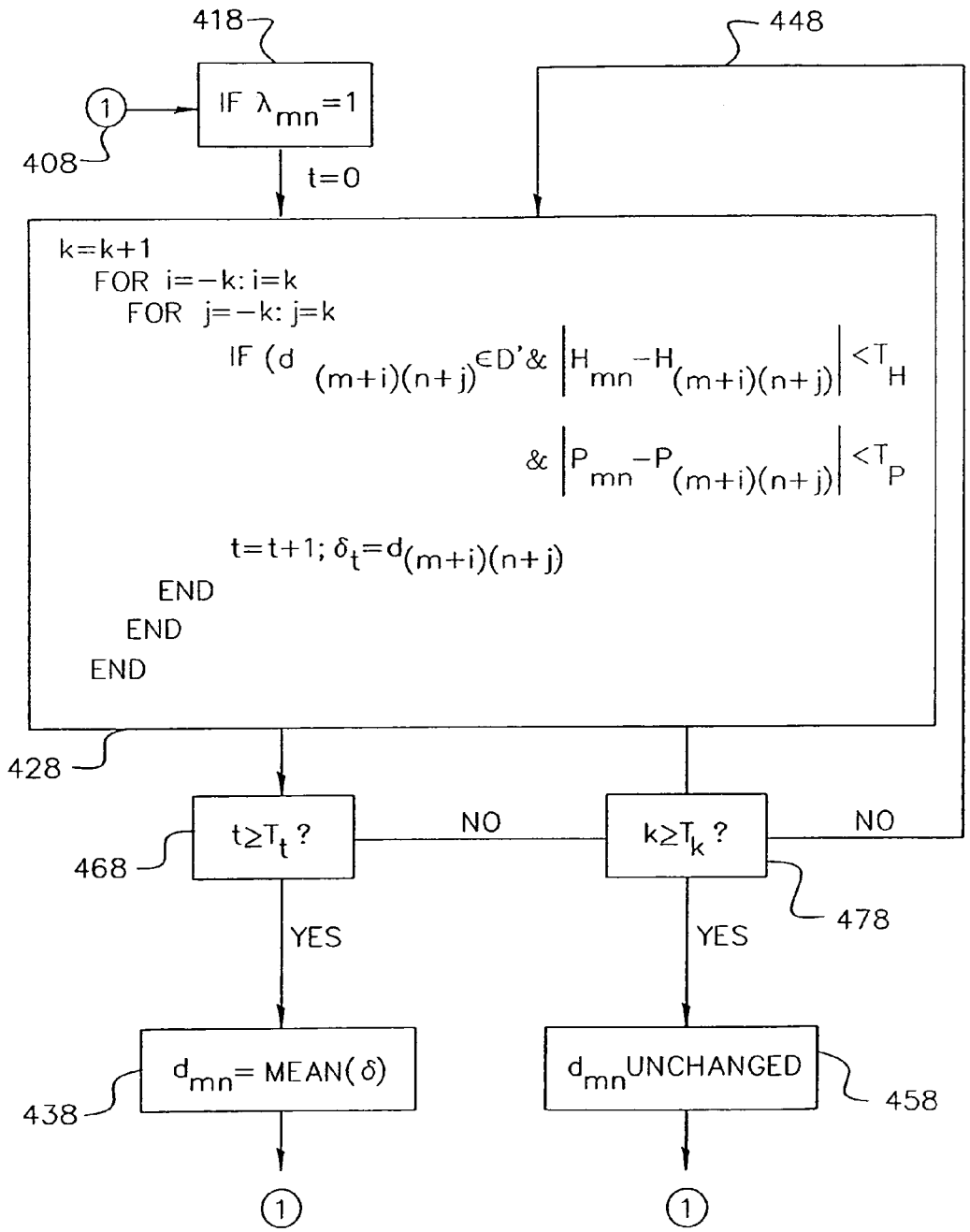
FIG. 9 is a more detailed flow chart for the second step in FIG. 6.

In accordance with the flow chart in FIG. 9, the propagation process starts at an input terminal 408. A (2k+1)×(2k+1) window is centered at $\lambda_{mn}$=1 (as shown in blocks 418 and 428). k is initialized as zero and adjustable from 1 to a predefined integer $T_K$ (see blocks 428 and 478). Search within the window for the elements $d_{(m+i)(n+j)} \in D'|_{-k<i,j<k;i,j\neq 0}$ that have similar color property as $d_{mn}$ (block 428). The color property similarity measure is a simple distance testing in the color space by checking if the difference between $d_{mn} \in D''$ and $d_{(m+i)(n+j)} \in D'$ is less than a predetermined threshold $T_H$ in hue domain and $T_P$ in purity domain (see block 428). Define a vector δ that collects minimum $T_t$ number of elements, $d_{(m+i)(n+j)}$, that satisfy the criteria (see blocks 468 and 428). If there is not enough satisfied elements within the window that has a size up to $2T_k+1$, then $d_{mn}$ is unchanged (blocks 478 and 458); otherwise, $d_{mn}$=mean(δ) (see block 428, where $\delta_t = d_{(m+i)(n+j)}$, and block 438).

Foreground Mask Generation

Figure 10:
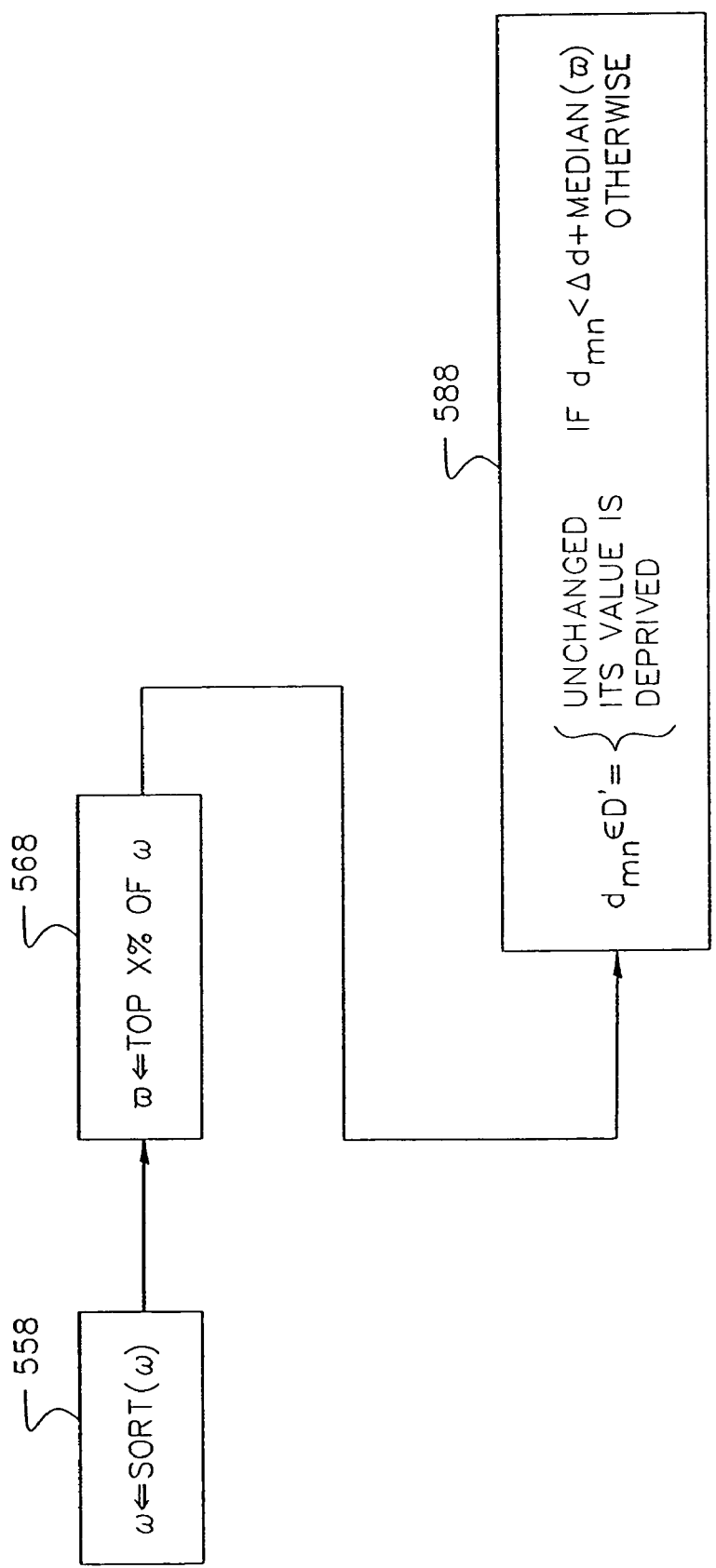
FIG. 10 is a more detailed flow chart for the third step in FIG. 6.

The foreground differentiation process is summarized in FIG. 10. The generated depth map D provides sufficient spatial information to locate the foreground objects three dimensionally. The foreground objects can be readily differentiated based on the depth values of the depth map D. In accordance with FIG. 10, let ω be a vector containing the elements $d_{mn} \in D'$ that are assigned with depth values. Sort the vector ω in a descending order (or ascending order) and then collect the top (or bottom) x % (between 10% to 30%) of its sorted elements (see blocks 558 and 568). Denote the collected elements by $\bar{\omega}$. Examine the elements $d_{mn} \in D'$. Change $d_{mn} \in D'$ to $d_{mn} \in D''$ if its value is greater (if ω is in a descending order) than Δd+median($\bar{\omega}$) (block 588), where Δd is an estimated thickness value of the foreground.

The result of the above process is a reduced set of D' that contains essentially the foreground elements. In some cases there are uninterested objects that also belong to the foreground of the scene. These uninterested objects have to be removed before the formation of the foreground depth mask. Generally, there is a distance between the foreground objects of interest and that of no interest. In accordance with the present invention, the following steps are carried out to correct this problem. Compute the histogram of the elements $d_{mn} \in D'$ column-wise after the foreground differentiation process is done. Find the valley(s) of the envelope of the computed histogram. Use the detected valley as a spatial indicator to delete unwanted foreground points. The result is a further reduced set of D' that contains the foreground points of interest.

Figure 11:
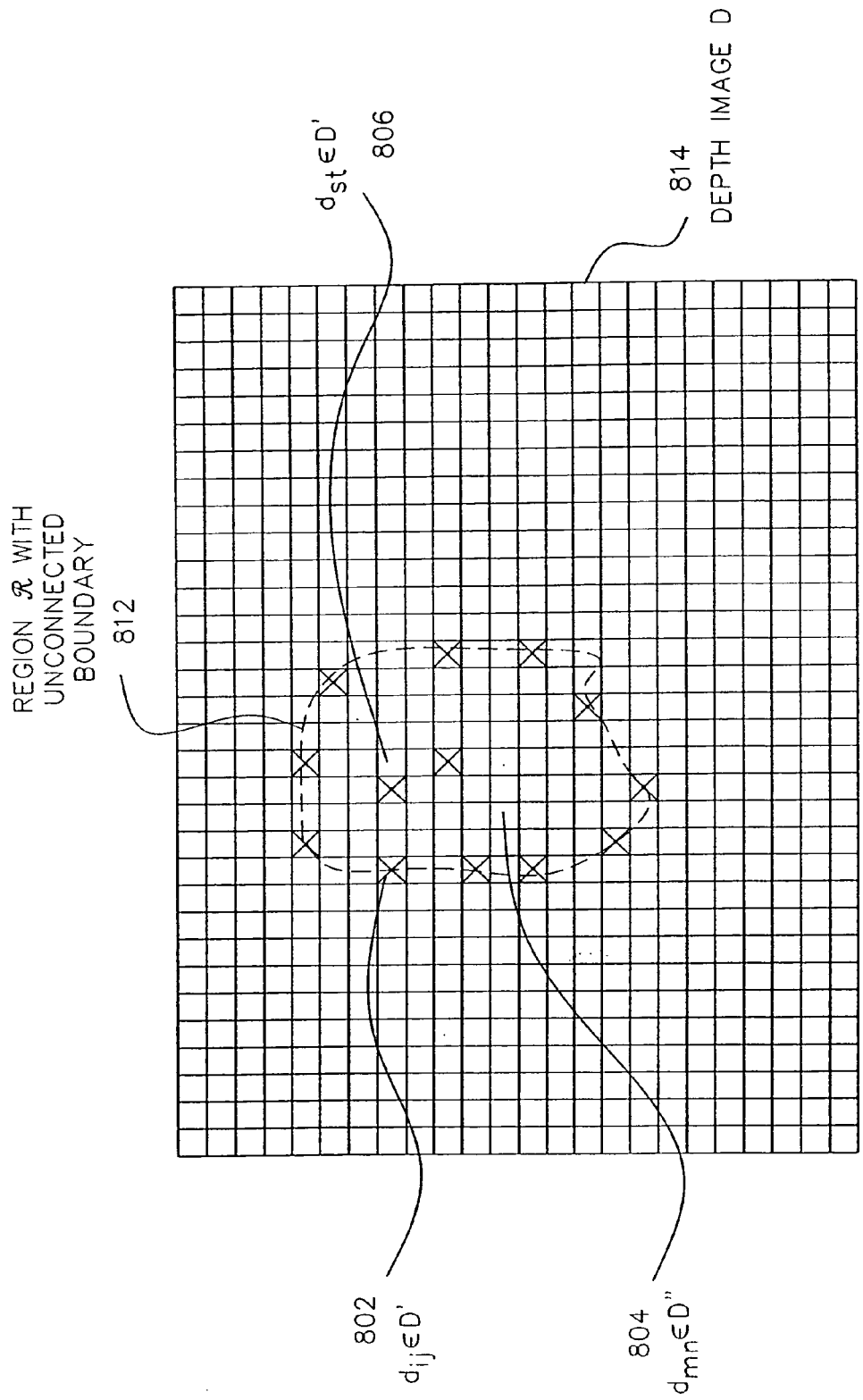
FIG. 11 is a diagrammatic illustration depicting a region that is to be interpolated to form the foreground depth mask.

In accordance with the invention, the color property assisted depth interpolation is carried out to form a foreground depth mask. Denote ℜ as the region 812 where the remaining elements of D' reside within the map 814 (D), (see FIG. 11). This region 812 (ℜ), has unconnected boundary points 802 ($d_{ij} \in D'$) as well as interior points 806 ($d_{st} \in D'$) that are all edge points of the foreground object of interest. This region ℜ also contains elements 804 ($d_{mn} \in D''$). The goal is to estimate depth values for those points 804 ($d_{mn} \in D''$) in the region 812 (ℜ) based on the points 802 ($d_{ij} \in D'$) or 806 ($d_{st} \in D'$) through a color property assisted eight-nearest-neighbor LMS (least median squared) interpolation process. The procedure is quite similar to that shown in FIG. 9 but with a different search strategy and estimation function. For every element 804 ($d_{mn} \in D''$) inside the region 812 (ℜ), search and collect its eight-nearest-neighbor elements 802 ($d_{ij} \in D'$) or 806 ($d_{st} \in D'$) with similar color properties. If the number of collected elements, N, is less than M (M is a user selected number, 3≤M≤5), increase the eight-nearest-neighbor search distance until the search reaches a predefined distance limit. The maximum value for N is 8. If M≤N≤8, choose M elements out of N at a time. So, there are C number of choices, where $$C = \frac{N!}{M!(N-M)!}.$$

Use each of the C sets of M elements to compute a linear model, Ψ, with parameter vector $\beta_c$ which best fits a surface patch covering the M elements. There are C number of $\beta_c$ vectors, 1≤c≤C. For each of the $\beta_c$ vectors, find the weighted median of the square of the residual of the N elements (see Eq. (21)). The weight is a reciprocal of the distance from elements 804 ($d_{mn}$) to 802 ($d_{ij}$) or 806 ($d_{st}$). The final choice will be the vector $\beta_c$ that minimizes the weighted median of the square of the residuals:

$$\beta_{\min} = \min_{\beta_c} \left\{ \underset{q,p}{\text{weighted median}} [\underbrace{(d_{qp} \in D' - \Psi(q, p; \beta_c))^2}_{residual}] \right\} \quad \text{Eq. (21)}$$

where $\Psi(q,p,\beta_c) = \beta_{c1} + q\beta_{c2} + p\beta_{c3} + qp\beta_{c4}$, and $d_{qp}$ is one of the N elements including $d_{ij}$ and $d_{st}$. Use the selected parameter vector $\beta_{min}$ to estimate the depth value for element 804 ($d_{mn} \in D''$). Normally, two to three iterations of this process will fill the region 812 (ℜ) completely. This filled region becomes the foreground depth mask. This mask can be applied to the original intensity image to extract the foreground object of interest and to position the extracted object in a 3D graphics, or in a 2D picture.

In a typical implementation of the invention, the computer program product bearing the inventive algorithms would either be provided directly to a user, who would use it in connection with the processing of images, or it would be used in a shared setting, where a customer would bring pictures and/or negatives to the shared computer for scanning and enhancement, or would directly enter digital scan data into the shared computer. Alternatively, the algorithms could be made available in a web-based version of the product, where either the algorithms are downloaded via the network connection to the user or the algorithm computation is done on a server in a web-based environment.

In the following description, another further embodiment of the present invention will be described as a software program.

Figure 14A:
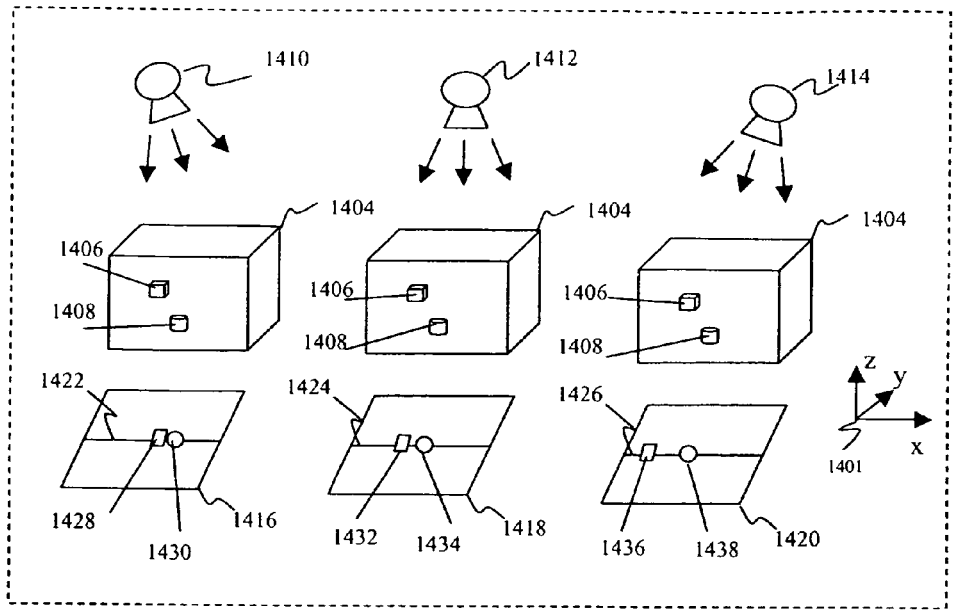
FIG. 14A is a diagrammatic illustration depicting an x-ray image acquisition system in accordance with the present invention.

Referring now to FIG. 14A, a tomosynthesis system is arranged to acquire multiple X-ray images (also referred to as a projection image). An exemplary three dimensional body 1404 has two exemplary physical objects 1406 and 1408 at different vertical (depth, z direction; see reference 3D system 1401) positions. An X-ray source 1412 produces incident X-rays that, in turn, produces an image 1418 on a cassette or a digital detector (not shown). (Assuming image 1418 contains one scan line 1424 only.) The imaged physical objects 1406 and 1408 become image objects 1432 and 1434 respectively on scan line 1424. Note that objects 1432 and 1434 locate at different positions along the x-axis (i.e., x direction; see reference 3D system 1401 in FIG. 14A).

With altering the orientation of the X-ray source and the detector (refer to the Dobbins' article), a new x-ray source 1410 generates a new image 1416. Note that the imaged physical objects 1406 and 1408 become image objects 1428 and 1430, respectively. The image objects 1428 and 1430 locate at different positions along the x-axis. Note also that the positions of objects 1428 and 1430 are different from the positions of objects 1432 and 1434.

With altering the orientation of the X-ray source and the detector (refer to Dobbins' article), another new x-ray source 1414 generates a new image 1420. Note that the imaged physical objects 1406 and 1408 become image objects 1436 and 1438, respectively. The image objects 1436 and 1438 locate at different positions along the x-axis. Note also that the positions of the image objects 1436 and 1438 are different from the positions of image objects 1432 and 1434, and the positions of image objects 1428 and 1430. It is understood that objects 1428, 1430, 1432, 1434, 1436 and 1438 are represented by intensity values.

The approach that recovers relative depth information of objects 1406 and 1408 is discussed next. For ease of convenience, the scan lines 1422, 1424, and 1426 are arranged in a manner such that these three scan lines are aligned in an x-direction shown in the left side of FIG. 14B.

The alignment of the three scan lines reveals that the image objects (i.e., 1428, 1432 and 1436) of the same physical object 1406 in three images (i.e., 1416, 1418 and 1420) are located at different x positions. The alignment also reveals that the image objects (i.e., 1430, 1434 and 1438) of the same physical object 1408 in three images (i.e., 1416, 1418 and 1420) are located at different x positions.

In conventional tomosynthesis, a common practice is to use a so called 'shift-and-add' scheme to generate a set of slice images from the summation of a set of shifted projection images acquired at different orientations of the x-ray source and detector (refer to the Dobbins' article).

Figure 14B:
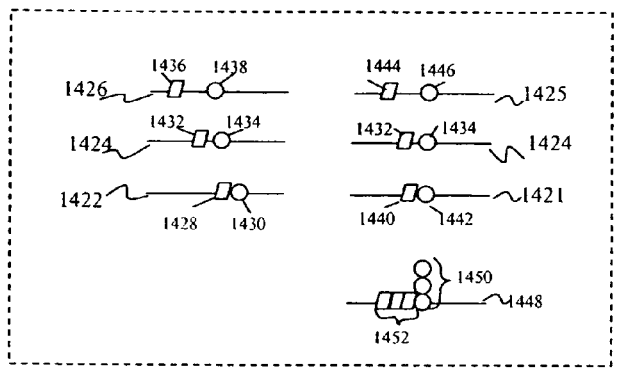
FIG. 14B is a diagrammatic illustration depicting an x-ray image 'shift-and-add' operation in accordance with the present invention.

The practice of 'shift-and-add' may be better understood intuitively using FIG. 14B. For example, in FIG. 14B, three locations of the x-ray image objects (1430, 1434 and 1438) are depicted. The image objects (1430, 1434 and 1438) may be shifted and added so as to bring them into coincidence (i.e., focus), with the complementary objects (1428, 1432 and 1436) smeared out. The results of shifting image objects (1430, 1434 and 1438) are three new objects (1442, 1434 and 1436) shown at the right side of FIG. 14B, the results of shifting image objects (1428, 1432 and 1436) are new objects (1440, 1442 and 1444).

Indeed, objects 1432 and 1434 do not shift, object 1436 and 1438 shift in the positive x direction on scan line 1425 and object 1428 and 1430 shift on scan line 1421 in the negative x direction. The result of adding the shifted images is depicted as scan line 1448 with objects 1450 and 1452. Object 1450 represents three coincided objects (1442, 1434 and 1436), object 1452 represents three smeared objects (1440, 1442 and 1444).

Figure 14C:
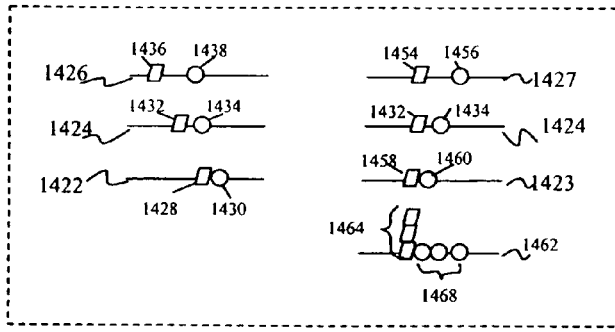
FIG. 14C is a diagrammatic illustration depicting an x-ray image 'shift-and-add' operation in accordance with the present invention.

Using the same scheme, the image objects (1428, 1432 and 1436) may be shifted and added so as to bring them into coincidence (i.e., focus), with the complementary objects (1430, 1434 and 1438) smeared out. The results of shifting image objects (1428, 1432 and 1436) are three new objects (1458, 1434 and 1452) shown at the right side of FIG. 14C, the results of shifting image objects (1430, 1434 and 1438) are new objects (1460, 1434 and 1456). In fact, objects 1432 and 1434 do not shift, object 1436 and 1438 shift in the positive x direction on scan line 1427 and object 1428 and 1430 shift on scan line 1423 in the negative x direction. The result of adding the shifted images is depicted as scan line 1462 with objects 1464 and 1468. Object 1464 represents three coincided objects (1458, 1432 and 1454), object 1468 represents three smeared objects (1460, 1434 and 1456).

The process of coinciding objects in x-ray images can be equated to finding correspondent points in stereo images discussed in the previous embodiment. The computation method of depth in stereo images can be applied to tomosynthesis images after some alternations.

Recall that in stereo imaging described previously, depth, $z_p$, of point p, can be readily computed using the found disparity $d_p$: $z_p = fb/d_p$, where b is a baseline (distance between the centers of two camera image planes) and f is a camera focal length. Recall also that the disparity $d_p$ is the coordinate difference between two corresponding points in two images. It is understood that parameters b and f are constants as soon as the focal length of the camera is selected and the distance between the cameras is fixed. Therefore, a normalized depth can be devised as $$\bar{z}_p = 1/d_p \qquad \text{Eq. (22)}$$

where $\bar{z}_p = z_p/(fb)$. Eq. (22) reveals that a meaningful depth (relative depth) is a reverse function of image point disparities. The method of computing relative depth can be applied to tomosynthesis images.

Returning again to FIG. 14B, example of using Eq. (22) in tomosynthesis images will be discussed.

The shift-and-add method used in conventional tomosynthesis aligns corresponding image points in different images. For example, image points 1438 and 1434 are corresponding points. Shifting point 1438 to a new location (i.e., 1446) aligns the original point (1438) to image point 1434. The distance that image point 1438 travels to a new location (1446) is equivalent to the disparity between two corresponding points in stereo images.

Denote the distance that image point 1438 travels to new location (1446) by $d_1$. Similarly, denote the distance that image point 1430 travels to new location (1442) by $d_2$. The distance quantities $d_1$ and $d_2$ are regarded as disparities using stereo vision terminology. Image 1418 is regarded as a reference image.

In this exemplary tomosynthesis system, x-ray sources 1410 and 1414 are placed in such a way that they have equal distance to x-ray source 1412 from left and right respectively, however this is not a necessary requirement in practice. The relative depth of physical point 1408 thus can be computed as $$\bar{z} = 1/\text{average}(d_1, d_2) \qquad \text{Eq. (23)}$$

$$\text{where average}(d_1, d_2, \ldots, d_N) = \frac{1}{N}\sum_{i=1}^{N} d_i.$$

The function average(●) reduces noise in computation. As in the previous embodiment, disparity limit constraint and ordering property are applicable in this tomosynthesis embodiment.

The invention has been described with reference to a preferred embodiment. However, it will be appreciated that variations and modifications can be effected by a person of ordinary skill in the art without departing from the principle of the invention. For instance, x-ray images may be subject to operations such as scaling, distortion correction, or geometrical transformation. One x-ray source may be used to acquire multiple x-ray images by translating or rotating or the combination of translation and rotating the x-ray source. Or multiple x-ray sources may be used. In a preferred embodiment, at least three x-ray images of a patient taken from different perspectives are employed.

All documents, patents, journal articles and other materials cited in the present application are hereby incorporated by reference.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 grey scale image
11a, 11b cameras
13a, 13b images
14a, 14b person images
15a, 15b computer images
17 person
16 computer
18 foreground mask image
19 foreground depth mask
20 composited image
21 corresponding region
31 door scene
34 intermediate image
35 portion
36 door
41 composite image
62 face picture
63 person
72a, 72b points
73a, 73b 2D image coordinate system
73 3D world coordinate system
74a, 74b nodal points
75 3D point
76 depth information
78 XZ plane
81 focal length
82 baseline
91 vertical indices
92a, 92b feature points
93a, 93b intensity segments
95 vertical scan line
98a bottom image
98b top image
110 computer system
112 microprocessor
114 display
116 keyboard
118 mouse
120 selector
122 CD-ROM memory
124 compact disk
126 floppy disk
127 network connection
128 printer
130 PC card
216 feature points matching
217 disparity propagation
218 foreground mask formats
252 matrix
253 initial score matrix
255 notch score
302a, 302b match networks
304a, 304b match map
308 consistency test block
312 final match map
408 input terminal
418 block
428 block
438 block
458 block
468 block
478 block
558 block
568 block
588 block
802 boundary point
804 element
806 interior point
812 region
814 depth map
1404 physical object body
1406 object
1408 object
1410 x-ray source
1412 x-ray source
1414 x-ray source
1416 x-ray image
1418 x-ray image
1420 x-ray image
1421 scan line
1422 scan line
1423 scan line
1424 scan line
1425 scan line
1426 scan line
1427 scan line
1428 image point
1430 image point
1432 image point
1434 image point
1436 image point
1438 image point
1440 image point 1442 image point
1444 image point
1446 image point
1448 scan line
1450 image point
1452 image point
1454 image point
1456 image point
1458 image point
1460 image point
1462 scan line
1464 image point
1468 image point

What is claimed is:

1. A method of forming a relative depth map from at least three x-ray images of a patient taken from different perspectives, said method comprising the steps of:
    (a) selecting one of the x-ray images as a reference image;
    (b) identifying corresponding objects within the reference image and the other images;
    (c) computing a disparity between the identified corresponding objects; and
    (d) generating the relative depth map from the disparities.

2. The method of claim 1, wherein step (b) is accomplished by applying a shift-and-add operation to the at least three x-ray images.

3. The method of claim 1, wherein step (c) is accomplished by averaging a distance between an object in the reference image and the corresponding object in the other images.

4. The method of claim 1, wherein step (d) is accomplished by applying a reverse function to the disparity.

5. A computer storage product having at least one computer storage medium having instructions stored therein causing one or more computers to perform the method of claim 1.

* * * * *